Jan. 30, 1945. H. E. BUC 2,368,446
PROCESS FOR PREPARING OLEFINS FROM ALKYL HALIDES
Filed July 10, 1940
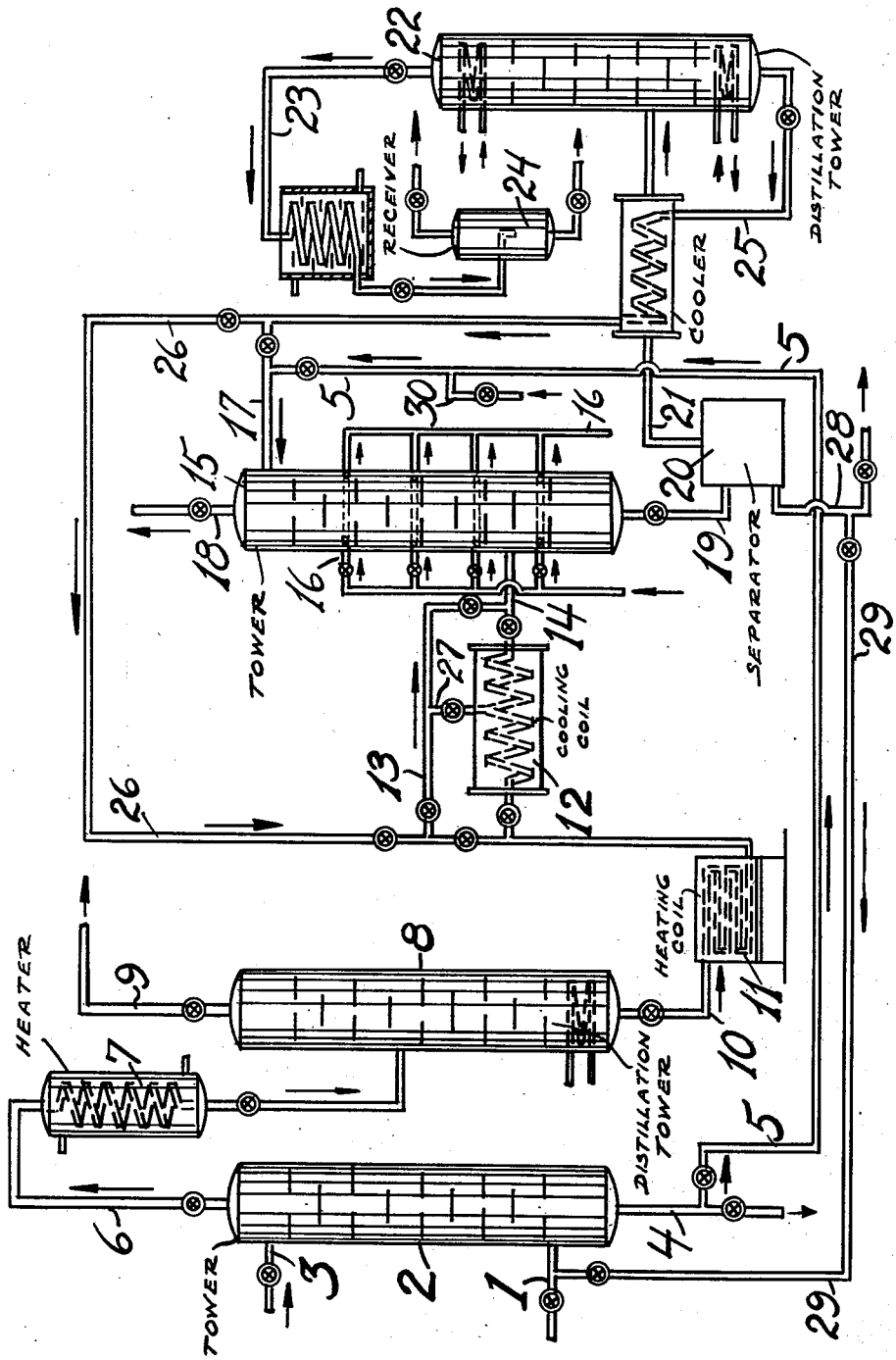
Hyym E. Buc Inventor
By _____ Young Attorney Patented Jan. 30, 1945

2,368,446

UNITED STATES PATENT OFFICE 2,368,446

PROCESS FOR PREPARING OLEFINS FROM ALKYL HALIDES

Hyym E. Buc, Roselle, N. J., assignor to Standard Oil Development Company, a corporation of Delaware Application July 10, 1940, Serial No. 344,657

11 Claims. (Cl. 260—677)

This invention relates to an improved method for obtaining olefins from alkyl halides which is of especial value in the separation of tertiary olefins from mixtures with other olefins as in cracked petroleum products.

The tertiary olefins, such as isobutylene and trimethylethylene, can be readily separated from mixtures, such as cracked petroleum fractions, containing saturated and other unsaturated hydrocarbons, such as butene-1, butene-2, n-amylene-1 and -2, isoamylene and the like, by treating the mixtures with a hydrogen halide under conditions such that only the tertiary olefins react, with the formation of tertiary alkyl halides. For example, a mixture of saturated and unsaturated hydrocarbons of 4 carbon atoms, known as the "C4 cut" and obtained by fractional distillation of cracked petroleum products, may be treated with anhydrous hydrogen chloride at about −78° C., and the isobutylene contained in the mixture will thus be converted substantially completely to tertiary butyl chloride, there being no appreciable reaction of hydrogen chloride with either the butene-1 or butene-2 contained in the hydrocarbon mixture. A similar selective reaction may also be secured with concentrated aqueous hydrochloric acid at room temperature, the reaction being much more rapid. The tertiary alkyl halides thus formed may be separated from the unreacted hydrocarbons by any suitable method, such as solvent extraction and/or fractional distillation, and the separated tertiary alkyl halides may then be treated to recover therefrom the tertiary olefins. Tertiary amyl chloride, for example, may be decomposed to trimethylethylene and hydrogen chloride by passing it at a temperature of 300°– 350° C. over bauxite or other suitable contact material. However, owing to the ease with which the decomposition products, namely, the tertiary olefin and hydrogen halide, recombine even at room temperature, the separation of these decomposition products has heretofore been incomplete and inefficient.

It has now been found that the dissociation products, namely, the tertiary olefin and hydrogen halide, can be readily separated without loss by bringing the mixture into contact with a selective solvent for the olefin before the temperature has been reduced to a point at which recombination is appreciable and/or so quickly that such recombination of olefin and hydrogen halide is largely avoided. In this manner, any dilution or loss of the hydrogen halide is avoided and the extent of recombination of the olefin and the hydrogen halide is reduced substantially to a minimum. The olefin is thus recovered in substantially theoretical yields and the separated hydrogen halide is in condition for immediate return to the zone in which the initial treatment of further amounts of cracked petroleum fractions or other mixtures of olefins is performed.

A solvent for the hydrogen halide may also be used in conjunction with the solvent for the olefin, provided that the two solvents are substantially immiscible with each other. In this case, it is desirable to separate the two solvent phases as quickly as possible after the absorption is carried out. For example, oil and water may be used as the respective solvents, and the resulting oil solution of olefins may be separated from the aqueous hydrogen halide by gravity; this separation may be accelerated by means of a centrifuge. The aqueous hydrogen halide may then be returned for further treatment of additional olefinic stocks, and the spent or weak solution of aqueous hydrogen halide resulting from this latter treatment may be used as the solvent for hydrogen halide formed in the dissociation of the tertiary alkyl halides, and may be thereby fortified for further use in the treatment of olefinic stocks.

While this invention is directed especially to the preparation of tertiary olefins from tertiary alkyl halides, it also applies to the recovery of olefins from the dissociation products of other alkyl halides, both normal and secondary.

The drawing is a diagrammatic sketch in partial sectional elevation of suitable equipment for carrying out a process which illustrates the present invention which is in no way limited to the particular apparatus described, and indicates the flow of materials.

Similar index numbers refer to similar parts throughout the figure of the drawing.

Referring to the drawing in greater detail, a mixture of secondary and tertiary olefins such as a cracked fraction or preferably the C4 or C5 cut thereof is passed by line 1 into tower 2 which is maintained at a suitable temperature for the desired reaction. A hydrogen halide such as a concentrated aqueous solution of hydrogen chloride is supplied by line 3 to the tower 2 and is brought into countercurrent contact therein with the olefin mixture. The excess hydrogen halide is then withdrawn as a relatively dilute aqueous solution from the bottom of the tower by line 4 and may be passed by line 5 to suitable equipment for absorption of hydrogen halide and reconcentration as will be described hereinafter.

The tower 2 is maintained under suitable conditions of temperature and pressure for the formation of the desired alkyl halide; for example, it may be controlled for the selective reaction of the tertiary olefins to form tertiary alkyl halides, with no appreciable reaction of secondary olefins with the hydrogen halide. It may also be provided with any suitable catalysts for promoting the desired reaction, such as alumina, silica gel, antimony trichloride, calcium chloride, and the like. The mixture of alkyl halides and unreacted hydrocarbons is withdrawn by line 6 and is passed through heater 7 into a distillation column 8. This mixture may be first washed with water or neutralized with any suitable base to remove any unreacted hydrogen halide, and to prevent reaction thereof with other olefins before the temperature of the mixture is raised. Any unreacted hydrocarbons are removed from the top of column 8 by line 9 and the alkyl halides are withdrawn by line 10. They are then passed through a heating coil or other suitably heated reaction chamber 11 in which they are heated to a temperature sufficient to cause dissociation into olefin and hydrogen halide. The dissociation may be promoted by bauxite or other suitable catalysts such as alumina, silica, carbon, activated carbon, platinized asbestos, or the chlorides of metals such as nickel, cobalt, iron, cadmium, lead, barium and calcium. The hot dissociation products may then be passed quickly through a cooling coil 12 or through by-pass line 13 and line 14 into the lower portion of a tower 15. This tower is preferably provided with suitable cooling means such as the pipes 16 for indirect heat extraction, by means of a cooling fluid circulated therethrough, from the materials within the tower 15. The dissociation products from line 14 are brought quickly into contact in tower 15 with a mixture of immiscible liquids, one having a selective solvent action for the olefins, such as a hydrocarbon oil, and the other having a selective solvent action for the hydrogen halide, such as water or a weak aqueous solution of hydrogen halide. These solvents may be supplied to the upper portion of the tower 15 by the line 17 and may pass down the tower countercurrent to the rising stream of dissociation products. These products are thus cooled in the cooler 12 and/or in the tower 15 to a temperature sufficient to permit substantially complete absorption by the selective solvents, such as about 25° C. or a preferably lower temperature. Any undissolved products, such as fixed gaseous decomposition products, leave the top of the tower by line 18. The mixed solutions of the olefin and hydrogen halide leave the tower by line 19 and are quickly passed into a suitable separator, such as the centrifuge 20. The oil layer is separated therein from the water layer and is withdrawn through line 21 and then passed through suitable distillation equipment such as the tower 22 by which the olefin is distilled overhead through line 23 and is collected in receiver 24 while the solvent, substantially freed of olefin, is withdrawn by line 25 and is returned after cooling to tower 15 by line 17. A portion of this solvent may also be passed through line 26 into direct contact with the dissociation products leaving the reaction vessel 11 and may thus be used to quench these products rapidly to any desired temperature. The dissociation products may also be first partially cooled in cooler 12 before contact with the quenching oil by means of line 27, in order to avoid any undesirable reaction therewith.

The water layer is withdrawn from the separator 20 by line 28 and may be returned directly to the tower 2 by lines 29 and 1 for further treatment of olefinic materials. The relatively dilute aqueous hydrogen halide leaving the tower 2 by line 4 may be passed by lines 5 and 17 to the tower 15 for absorption of hydrogen halide from the alkyl halide dissociation products. Water may be supplied for this purpose by line 30.

The alkyl halide dissociation products may also be brought into contact with only a single selective solvent for one component thereof, e. g., the tower 15 may be supplied only with oil to dissolve the olefin, and the unabsorbed hydrogen halide may be withdrawn from the top of the tower by line 18.

In this case the hydrogen halide in line 18 may be dissolved in water or in the weakened hydrogen halide from line 5 and the reconcentrated hydrogen halide returned to line 1 for further use.

If it is desired to conduct the hydrohalogenation with a dry hydrogen halide, this absorption in water may be omitted and the hydrogen halide in line 18 may be used directly. The reaction with dry hydrogen halide is usually much slower, however, and is preferably conducted under pressure.

The following example illustrates the application of this invention to the separation of trimethyl-ethylene from a cracked petroleum fraction containing other olefins.

A cracked petroleum fraction boiling between about 25° and 40° C. and known as the "C₅ cut" is treated with aqueous hydrogen chloride (30 to 36% concentration) at a temperature of 20° to 25° C. and under atmospheric pressure in order to convert selectively the trimethyl-ethylene contained in this fraction into tertiary amyl chloride. The hydrogen chloride is used in such amount that its concentration is reduced to about 25% by this reaction, at which concentration the reaction rate becomes quite slow. Following the completion of this reaction, the aqueous phase is separated from the non-aqueous phase, and the latter is distilled in order to separate the unreacted hydrocarbons from the tertiary amyl chloride. The tertiary amyl chloride is then passed over bauxite or other suitable catalyst, such as clay impregnated with phosphoric acid, at a temperature of 320° C., and is thereby dissociated to the extent of about 90% into amylene and hydrogen chloride. The dissociation products are cooled quickly to about 10° to 20° C., and are then passed directly into contact with an amount of an oil, such as a fuming acid-treated kerosene or straw oil, sufficient to absorb the amylene. The unabsorbed vapors are then passed through water. Titration of the hydrogen chloride absorbed in the water indicated that 85% of the tertiary amyl chloride was dissociated into amylene and hydrogen chloride.

If the dissociation products leaving the dehydrochlorination zone in the above-described process are passed through ordinary condensers so as to condense the amylene and undecomposed amyl chloride, no oil solvent for the amylene being used, there results only a 40 to 50% yield of amylene (based on the amyl chloride treated), the remainder of the amylene undergoing recombination with the hydrogen chloride.

The process of this invention is useful for the dissociation of organic halides generally into olefins and hydrogen halide, and is particularly advantageous in instances where the organic halide is formed by reaction of an olefin with hydrogen halide in the course of the separation of the olefin from other materials less reactive with hydrogen halide. In the application of the present invention to the latter process, a particularly advantageous feature is that the hydrogen halide liberated in the dissociation of the alkyl halide is available for recirculation to the initial stage of the process, in which it reacts with the desired olefin to form an alkyl halide which is separated from the unreacted materials with which the olefin was associated by a method making use of the difference in volatility, solubility, or other characteristics of the tertiary alkyl halide and the associated materials. The process of the invention is especially applicable to the dissociation of tertiary alkyl halides of 4 to 6 or more carbon atoms per molecule and the recovery of the corresponding tertiary olefins from the dissociation products, although it is also applicable to the treatment of olefin-hydrogen halide mixtures obtained in the dissociation of organic halides broadly.

The selective solvent used to absorb the olefins is preferably one that is non-reactive with hydrogen halides. Examples of such solvents are the organic halides, such as dichloroethane. Hydrocarbon oils are especially preferred, however, because of the extremely low solubility of hydrogen chloride in them and their ability to retard recombination of the olefin with the hydrogen halide in the dissociation products being treated. The hydrocarbon oil is preferably of a saturated nature and of suitably high boiling point to permit ready separation of the dissolved olefin therefrom. Kerosene or "straw" oils boiling preferably above about 400° F. are examples of suitable hydrocarbon oils, although even heavier fractions may be used. Such oils are preferably substantially inert to hydrogen chloride and may be either distillate fractions of suitably saturated crude oils or of crude oils which have been treated with strong or, preferably, fuming sulfuric acid to remove constituents which are reactive with hydrogen chloride.

It is claimed:

1. Improved process for obtaining an olefin from an organic halide comprising heating said organic halide in the vapor phase to a dissociation temperature, passing the resulting mixture of olefin and hydrogen halide immediately into contact with a liquid organic solvent having relatively high solvent power for olefins and relatively low solvent power for hydrogen halide, at a temperature at which said solvent is unvaporized, to selectively dissolve said olefin, and separating the solution of said olefin in said solvent from contact with said hydrogen halide.

2. Improved process according to claim 1 in which said organic halide is a tertiary organic halide.

3. Improved process according to claim 1 in which said organic halide is a tertiary organic halide of from 4 to 7 carbon atoms.

4. Improved process according to claim 1 in which said selective solvent is non-reactive with said hydrogen halide under the conditions of the process.

5. Improved process according to claim 1 in which said selective solvent is a substantially saturated hydrocarbon oil.

6. Improved process according to claim 1 in which said selective solvent is a substantially saturated hydrocarbon oil boiling mainly above 400° F.

7. Improved process for obtaining trimethylethylene from tertiary amyl chloride comprising heating tertiary amyl chloride in the vapor phase to a dissociation temperature, passing the resulting mixture of trimethylethylene and hydrogen chloride immediately into contact with a substantially saturated hydrogen oil boiling mainly above 400° F. which is a selective solvent for the trimethylethylene, and separating the resulting solution from contact with the hydrogen chloride.

8. Improved process for obtaining a tertiary olefin from a tertiary alkyl halide comprising heating said tertiary alkyl halide in the vapor phase to a dissociation temperature, passing the resulting mixture of tertiary olefin and hydrogen halide quickly into contact with a mixture of water and a water-immiscible selective solvent for said olefin, under suitable conditions for the absorption of said olefin, and separating the resulting solution of said olefin from the aqueous solution of said hydrogen halide.

9. Improved process for obtaining a mono-olefin from an alkyl monohalide comprising heating said alkyl halide in the vapor phase to a dissociation temperature, immediately cooling the resulting mixture of mono-olefin and hydrogen halide quickly to about 10 to 25° C. and bringing it immediately into contact with a liquid organic selective solvent for said mono-olefin, which solvent is inert to hydrogen halide and boils above the boiling point of the mono-olefin, and separating the solution of said mono-olefin in said solvent from contact with said hydrogen halide.

10. Improved process for obtaining trimethylethylene from tertiary amyl chloride comprising heating tertiary amyl chloride in the vapor phase to dissociation temperature, immediately cooling the resulting mixture of trimethylethylene and hydrogen chloride quickly to a temperature below about 25° C. and bringing it immediately into intimate contact with a liquid organic selective solvent for the trimethylethylene, which solvent is inert to hydrogen halide and boils above the boiling point of the olefin, and separating the resulting solution of said olefin in said solvent from contact with the hydrogen halide.

11. Improved process for obtaining a tertiary mono-olefin from a tertiary alkyl monohalide comprising heating said tertiary alkyl halide in the vapor phase to dissociation temperature, cooling the resulting mixture of tertiary olefin and hydrogen halide quickly to a temperature below about 25° C. and bringing it immediately into intimate contact with a mixture of water and a water-immiscible selective solvent for said olefin, which solvent is inert to hydrogen halide and boils above the boiling point of the olefin, and separating the resulting solution of said olefin in said solvent from the aqueous solution of said hydrogen halide.

HYYM E. BUC.